US012597828B2

(12) United States Patent

Regazzi et al.

(10) Patent No.: US 12,597,828 B2
(45) Date of Patent: Apr. 7, 2026

(54) PERMANENT MAGNET GENERATOR WITH STATOR TEETH MADE OF SHEETS WITH ORIENTED GRAINS FOR ON-BOARD VEHICLE CHARGING

(71) Applicant: DUCATI ENERGIA S.p.A., Bologna (IT)

(72) Inventors: Nicolò Regazzi, Bologna (IT); Gianni Regazzi, Bologna (IT); Alessandro Berghi, Bologna (IT); Adrian Popov, Bologna (IT); Andrea Compri, Bologna (IT)

(73) Assignee: DUCATI ENERGIA S.p.A., Bologna (IT)

( * ) Notice: Subject to any disclaimer, the term of this patent is extended or adjusted under 35 U.S.C. 154(b) by 148 days.

(21) Appl. No.: 18/246,937

(22) PCT Filed: Sep. 27, 2021

(86) PCT No.: PCT/IB2021/058791
§ 371 (c)(1),
(2) Date: Mar. 28, 2023

(87) PCT Pub. No.: WO2022/070018
PCT Pub. Date: Apr. 7, 2022

(65) Prior Publication Data
US 2023/0412047 A1     Dec. 21, 2023

(30) Foreign Application Priority Data
Sep. 29, 2020     (IT) ........................ 102020000022951

(51) Int. Cl.
*H02K 7/18* (2006.01)
*H02K 1/14* (2006.01)
*H02K 1/18* (2006.01)

(52) U.S. Cl.
CPC ........... *H02K 7/1861* (2013.01); *H02K 1/146* (2013.01); *H02K 1/187* (2013.01)

(58) Field of Classification Search
CPC ........ H02K 1/146; H02K 1/187; H02K 1/165; H02K 1/16; H02K 1/14; H02K 1/148; H02K 7/14; H02K 7/1861; H02K 2213/03
(Continued)

(56) References Cited

U.S. PATENT DOCUMENTS 1,771,475  A  *  7/1930  Wright ................... H02K 1/185
                                                              310/407
2,928,963  A  *  3/1960  Bertsche ................ H02K 19/24
                                                              310/168
(Continued)

FOREIGN PATENT DOCUMENTS

CN        207 134 879 U      3/2018
CN        110 212 662 A      9/2019
(Continued)

OTHER PUBLICATIONS

WO-2015019746-A1 English Translation.*
WO-2011003718-A2 English Translation.*

*Primary Examiner* — Maged M Almawri
(74) *Attorney, Agent, or Firm* — ASLAN LAW, P.C.

(57) ABSTRACT

A permanent magnet generator for on-board vehicle charging comprises an external rotor, a stator assembly accommodated inside the external rotor and provided with a stator yoke, with a plurality of stator teeth extending from the stator yoke and with a plurality of conductive windings arranged around each of said stator teeth, a permanent magnet associated with a portion of an internal wall of the external rotor and facing the stator assembly, wherein the stator yoke is made of magnetic steel sheet with non- (Continued)

oriented grains and the stator teeth are made of magnetic steel sheet with oriented grains.

12 Claims, 5 Drawing Sheets

(58) Field of Classification Search
USPC ........... 310/433, 216.051, 216.069–216.088
See application file for complete search history.

(56) References Cited

U.S. PATENT DOCUMENTS

| | | | | |
|---|---|---|---|---|
| 4,765,054 A * | 8/1988 | Sauerwein | ............. | H02K 3/522 |
| | | | | 310/216.115 |
| 4,912,353 A * | 3/1990 | Kondo | ................... | H02K 1/148 |
| | | | | 310/216.067 |
| 5,289,905 A * | 3/1994 | Braschler | ............... | F16D 65/04 |
| | | | | 188/296 |
| 5,485,050 A * | 1/1996 | Zimmermann | ........ | H02K 3/505 |
| | | | | 310/260 |
| 5,613,472 A * | 3/1997 | Edelmann | ............... | F16D 65/78 |
| | | | | 123/195 A |
| 5,796,190 A * | 8/1998 | Takeda | ..................... | H02K 1/32 |
| | | | | 310/156.31 |
| 6,140,728 A | 10/2000 | Tomita et al. | | |
| 6,822,364 B2 * | 11/2004 | Suzuki | ................... | H02K 1/148 |
| | | | | 310/216.012 |
| 7,583,001 B2 * | 9/2009 | Lu | ........................ | H02K 1/2791 |
| | | | | 310/67 R |
| 7,626,301 B2 * | 12/2009 | Enomoto | ................. | H02K 1/02 |
| | | | | 310/216.004 |
| 8,400,043 B2 * | 3/2013 | Leiber | ................... | H02K 1/148 |
| | | | | 310/215 |
| 9,013,086 B2 * | 4/2015 | Dokonal | ............... | H02K 1/187 |
| | | | | 310/216.057 |
| 10,148,139 B2 * | 12/2018 | Lauk | ..................... | H02K 1/24 |
| 10,243,438 B2 * | 3/2019 | Li | ......................... | H02K 29/03 |
| 11,245,293 B2 * | 2/2022 | Hsu | ........................ | H02K 1/148 |
| 11,289,984 B2 * | 3/2022 | Hsing | ................. | F16C 32/0497 |
| 11,329,528 B2 * | 5/2022 | De Filippis | ............ | H02K 11/20 |
| 11,451,119 B2 * | 9/2022 | Aso | ....................... | H02K 1/146 |
| 11,476,747 B2 * | 10/2022 | Bernicot | ................... | H02K 7/20 |
| 11,715,987 B2 * | 8/2023 | Ishikawa | ................ | H02K 9/193 |
| | | | | 310/88 |
| 12,149,120 B2 * | 11/2024 | Jang | ........................ | H02K 1/148 |
| 2001/0038797 A1 * | 11/2001 | Makino | .................... | H02K 7/14 |
| | | | | 417/410.3 |
| 2004/0068857 A1 | 4/2004 | Park et al. | | |
| 2004/0070304 A1 * | 4/2004 | Enomoto | ............. | H02K 15/022 |
| | | | | 310/216.088 |
| 2004/0189137 A1 * | 9/2004 | Hashimoto | ............ | H02K 29/03 |
| | | | | 310/402 |
| 2005/0189837 A1 * | 9/2005 | Lee | ........................ | H02K 3/522 |
| | | | | 310/215 |
| 2005/0200226 A1 * | 9/2005 | Kim | ....................... | H02K 1/148 |
| | | | | 310/216.057 |
| 2006/0279160 A1 * | 12/2006 | Yoshinaga | ............. | H02K 1/148 |
| | | | | 310/216.049 |
| 2011/0037338 A1 * | 2/2011 | Leiber | .................. | H02K 15/022 |
| | | | | 310/216.105 |
| 2011/0101816 A1 * | 5/2011 | Kondou | ................... | H02K 1/16 |
| | | | | 310/216.069 |
| 2012/0007463 A1 * | 1/2012 | Taniguchi | .............. | H02K 1/165 |
| | | | | 310/216.051 |
| 2012/0007464 A1 * | 1/2012 | Saito | ...................... | H02K 1/276 |
| | | | | 29/598 |
| 2012/0112600 A1 * | 5/2012 | Kondou | ................... | H02K 1/16 |
| | | | | 310/216.086 |
| 2012/0274164 A1 * | 11/2012 | Zrno | ...................... | H02K 16/02 |
| | | | | 310/114 |
| 2013/0002058 A1 * | 1/2013 | McIntosh | ............... | H02K 1/185 |
| | | | | 310/43 |
| 2013/0119789 A1 * | 5/2013 | Maekawa | ............. | H02K 21/12 |
| | | | | 310/46 |
| 2013/0119816 A1 * | 5/2013 | Yang | ........................ | H02K 1/24 |
| | | | | 310/216.007 |
| 2013/0306389 A1 * | 11/2013 | Penev | ..................... | B60L 8/003 |
| | | | | 180/165 |
| 2014/0152127 A1 * | 6/2014 | Tang | ........................ | H02K 1/02 |
| | | | | 310/43 |
| 2015/0076940 A1 * | 3/2015 | Ohashi | ..................... | H02K 5/04 |
| | | | | 310/58 |
| 2015/0214791 A1 * | 7/2015 | Lee | ........................ | H02K 1/148 |
| | | | | 310/51 |
| 2015/0222151 A1 * | 8/2015 | Semken | ................... | H02K 1/28 |
| | | | | 29/452 |
| 2015/0364966 A1 * | 12/2015 | Maihara | ................... | H02K 5/24 |
| | | | | 310/51 |
| 2016/0218585 A1 * | 7/2016 | Tzeng | ................. | H02K 7/1846 |
| 2017/0339752 A1 * | 11/2017 | Yamaguchi | .............. | H05B 6/02 |
| 2019/0368013 A1 * | 12/2019 | Aronhime | .............. | C22C 38/08 |
| 2020/0007019 A1 * | 1/2020 | Bernicot | ............... | H02K 49/04 |
| 2020/0287427 A1 * | 9/2020 | Stauder | ................. | H02K 1/148 |
| 2020/0381966 A1 * | 12/2020 | Yoshida | ................. | H02K 1/185 |
| 2021/0050752 A1 * | 2/2021 | Hsu | ........................ | H02K 1/148 |
| 2021/0159741 A1 * | 5/2021 | Walter | ................... | H02K 3/522 |
| 2021/0376670 A1 * | 12/2021 | Sumi | ...................... | H02K 1/148 |
| 2022/0077726 A1 * | 3/2022 | Le Berr | ................. | H02K 5/207 |
| 2022/0360122 A1 * | 11/2022 | Jang | ...................... | H02K 7/145 |

FOREIGN PATENT DOCUMENTS

| | | | | |
|---|---|---|---|---|
| CN | 210 693 577 U | 6/2020 | | |
| DE | 20 2009 009304 U1 | 10/2009 | | |
| JP | H11 127565 A | 5/1999 | | |
| JP | 2005 269721 A | 9/2005 | | |
| WO | WO 02/49190 A1 | 6/2002 | | |
| WO | WO-2011003718 A2 * | 1/2011 | ............... | B60L 7/24 |
| WO | WO-2015019746 A1 * | 2/2015 | ............. | H02K 1/146 |

* cited by examiner

Current delivered $I_{dc}$ @ $V_{bus}$ = 14V

PERMANENT MAGNET GENERATOR WITH STATOR TEETH MADE OF SHEETS WITH ORIENTED GRAINS FOR ON-BOARD VEHICLE CHARGING

CROSS-REFERENCE TO RELATED APPLICATIONS

This application claims priority to IT Patent Application No. 102020000022951 filed on Sep. 29, 2020, and this application claims priority to and is a 371 of international PCT Application No. PCT/IB2021/058791 filed on Sep. 27, 2021, the entire contents of which are hereby incorporated by reference.

TECHNICAL FIELD

The present invention relates to a permanent magnet generator for on-board vehicle charging.

BACKGROUND ART

In recent years the world of All Terrain Vehicles (A.T.V.) and snowmobiles has witnessed a deep change in the needs expressed to the component manufacturing industry.

Specifically, there has been a growing demand for electrical power to power on-board electronics which, in recent years, has also been largely included on these types of vehicles, but also an increasing miniaturization of the product, as the space on board dedicated to electrical power generation systems is less and less. These market demands are in stark contrast to each other, in fact the demand for greater electrical power tends to increase the size of the generator while the reduced space available on board the vehicle requires generators of increasingly smaller dimensions.

These market requirements were the main forces which drove the design towards the manufacture of permanent magnet electric generators (Alternating Current Generator A.C.G.), normally three-phase, with high power density.

In particular, two categories of magnetic sheets are known to possess such characteristics:

- magnetic sheets made of cobalt-based alloys;
- magnetic sheets made of grain-oriented iron-silicon alloys (GOES).

Magnetic sheets made of cobalt-based alloys have particularly high-performance and isotropic magnetic and leakage characteristics but, due to their high cost, they are used almost exclusively in the aerospace industry or in motor racing. Therefore, the magnetic sheets made of cobalt-based alloys are not very suitable for industrial production.

Magnetic sheets made of grain-oriented iron-silicon alloys have anisotropic magnetic characteristics, i.e., good magnetic characteristics of both permeability and saturation induction along the rolling direction, while in the direction orthogonal thereto the magnetic characteristics become comparable to those of non-grain oriented sheets.

The anisotropic magnetic characteristics of grain-oriented sheets imply that they cannot be used in the stators of electric generators to replace non-grain oriented sheets, since the magnetic flux crosses the stator teeth in a radial pattern and therefore, if the steel sheet making up the stator pack is made in a single body piece by shearing from a grain-oriented sheet, only some stator teeth will have the magnetic flux along the rolling direction.

Therefore, the current generators of known type which find application on the previously listed vehicles are traditionally produced with a laminar pack made by superimposing non-grain oriented steel sheets. The use of grain-oriented steel sheets is made difficult by the fact that along the direction orthogonal to the direction of grain orientation the electrical properties are unsatisfactory, together with this the current generator in its operation has a magnetic field with a directionality which cannot follow the orientation of the steel sheet's grains throughout its path.

DESCRIPTION OF THE INVENTION

The main aim of the present invention is to devise a permanent magnet generator for on-board vehicle charging which allows high specific power and efficiency to be obtained while maintaining a good performance to price ratio.

Another object of the present invention is to devise a permanent magnet generator for on-board vehicle charging, which allows the mentioned drawbacks of the prior art to be overcome within a simple, rational as well as easy and effective to use solution.

The aforementioned objects are achieved by the present permanent magnet generator for on-board vehicle charging according to the characteristics described in claim 1.

BRIEF DESCRIPTION OF THE DRAWINGS

Other characteristics and advantages of the present invention will become more evident from the description of a preferred, but not exclusive, embodiment of a permanent magnet generator for on-board vehicle charging, illustrated by way of an indicative, yet non-limiting example, in the accompanying tables of drawings wherein.

EMBODIMENTS OF THE INVENTION

Figure 1:
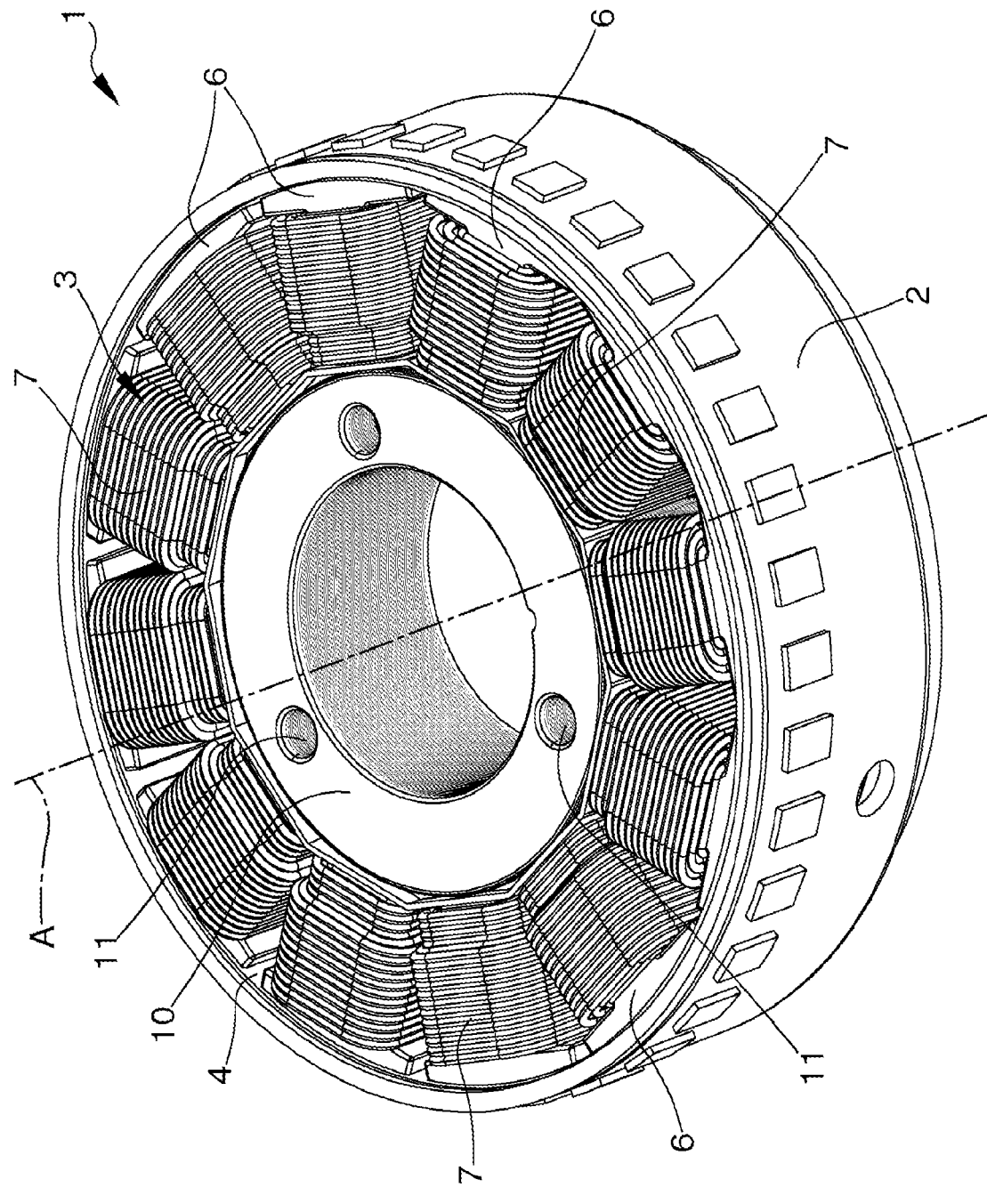
FIG. 1 is an axonometric view of the permanent magnet generator according to the invention.
Figure 2:
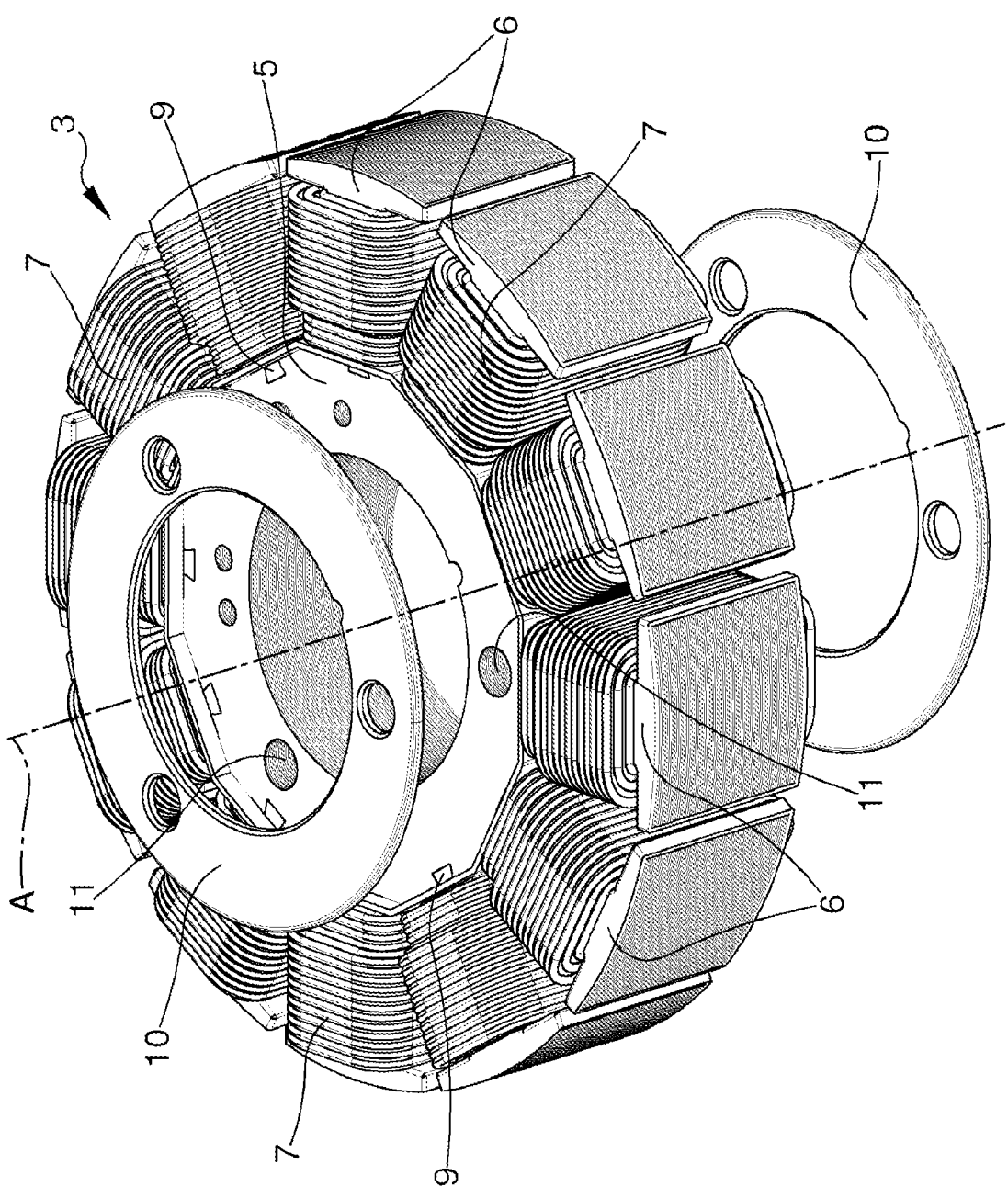
FIG. 2 is an axonometric and partial exploded view of a stator assembly of the permanent magnet generator according to the invention.
Figure 3:
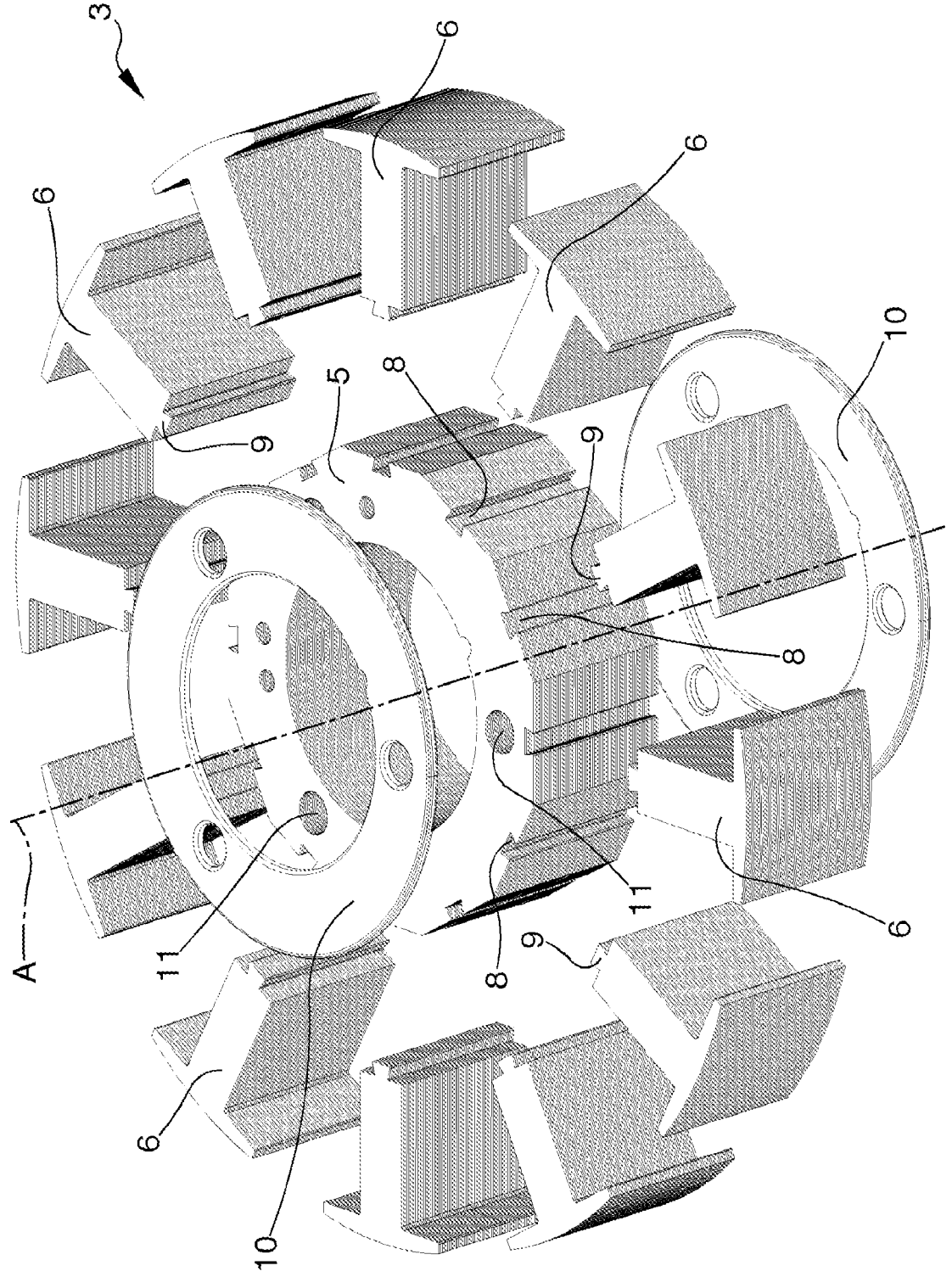
FIG. 3 is an axonometric and exploded view of the stator assembly of the permanent magnet generator according to the invention.

With particular reference to such figures, reference numeral 1 globally indicates a permanent magnet generator for on-board vehicle charging.

Therefore, the permanent magnet generator 1 according to the invention is used to power the on-board electronics of vehicles, such as, e.g., All Terrain Vehicles (A.T.V.) and snowmobiles.

The permanent magnet generator 1 comprises:

- an external rotor 2;
- a stator assembly 3 accommodated inside the external rotor 2;

at least one permanent magnet 4 associated with at least one portion of an internal wall of the external rotor 2 and facing the stator assembly 3.

The stator assembly 3 is rotatable around an axis of rotation A.

In particular, the stator assembly 3 is provided with a stator yoke 5, with a plurality of stator teeth 6 extending from the stator yoke 5 in a radial pattern, and with a plurality of conductive windings 7 (made of copper) arranged around at least one portion of each of the stator teeth 6.

According to a preferred embodiment, shown in the figures, the stator yoke 5 has a substantially circular and centrally drilled conformation with the stator teeth 6 extending in a radial pattern from the external perimeter surface.

Each stator tooth 6 has a substantially T-shaped profile.

Still according to such preferred embodiment, the external rotor 2 is made up of a housing ring of the entire stator assembly 3. A plurality of permanent magnets 4 is associated with the internal wall of the external rotor 2 and face the stator assembly 3.

Different embodiments of the stator assembly 3 and of the external rotor 2 cannot however be ruled out.

The main characteristic of the permanent magnet generator 1 according to the invention consists in the fact that:

the stator yoke 5 is made of magnetic steel sheet with non-oriented grains;

the stator teeth 6 are made of magnetic steel sheet with oriented grains.

This allows obtaining a permanent magnet generator 1 with high specific power and high efficiency, while maintaining a good performance to price ratio.

In fact, the grain-oriented magnetic steel sheet has the characteristic of having maximum magnetic permeability along the rolling direction and minimum magnetic permeability orthogonal thereto.

In a different way, the non-grain oriented magnetic steel sheet has a constant value of magnetic permeability regardless of the direction considered. The magnetic permeability value of the non-grain oriented steel sheet, however, is not much higher than the value of magnetic permeability in the direction orthogonal to the rolling direction of the grain-oriented steel sheet.

In addition to this, the grain-oriented magnetic steel sheet has low values of magnetization leakage along the rolling direction, contributing to improve the efficiency of the permanent magnet generator 1, as the iron leakage decreases.

The characteristic magnetic permeability of the steel sheet is obviously a quantity of fundamental importance since it influences the magnetic field produced and therefore the performance of the permanent magnet generator 1.

Figure 4:
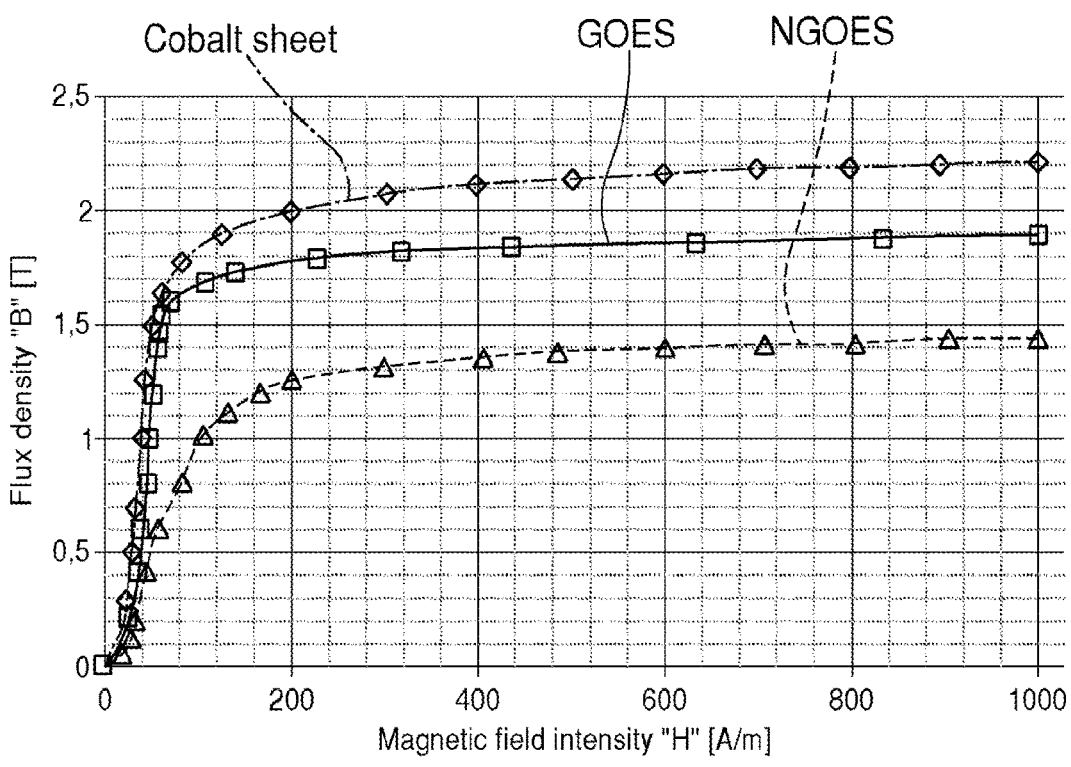
FIG. 4 is a graph comparing magnetization curves H-B for grain-oriented and non-grain oriented magnetic steel sheets.

As can be seen from the magnetization curves shown in the graph in FIG. 4, the grain-oriented steel sheet (GOES), along the rolling direction, is able to produce a flux density which is about 30%-35% higher than the non-grain oriented corresponding one (NGOES); this depends on the higher magnetic permeability characterizing the grain-oriented steel sheet, as postulated by the relation $B = \mu \cdot H$, where B is the flux density measured in Tesla, $\mu$ is the magnetic permeability expressed in H/m obtainable as the product between the magnetic permeability of the vacuum $\mu_0$ ($1{,}257 \cdot 10^{-6}$) and the magnetic permeability of the considered material $\mu_R$. Finally, H is the magnetic field intensity expressed in A/m.

Figure 5:
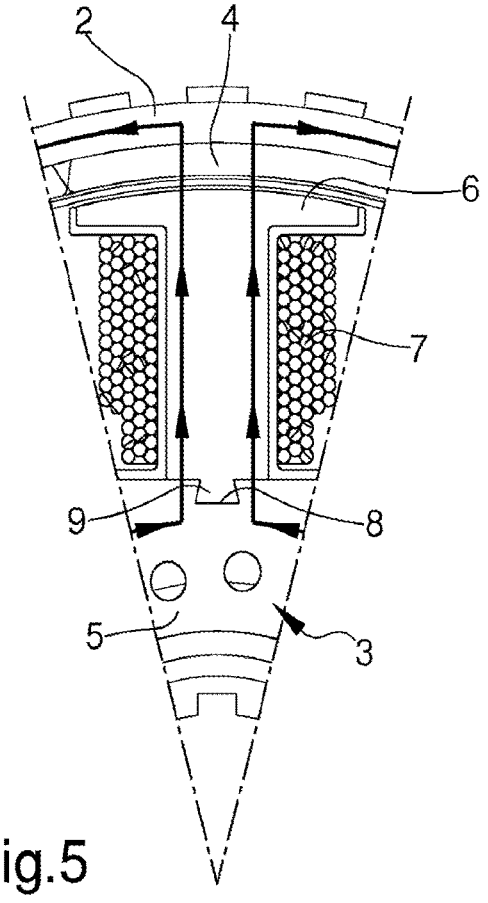
FIG. 5 is a schematic representation of the pattern of the magnetic field flux lines in a section of the permanent magnet generator according to the invention.

As schematized in FIG. 5, it is possible to verify that along each stator tooth 6, where the conductive windings 7 are carried out, the magnetic field moves almost in a straight line according to the directrix going from the center of the stator assembly 3 to the permanent magnets 6, while in the innermost part, it is not possible to find a univocal direction of the magnetic field, since it moves along circumferential arcs.

This characteristic of the orientation of the magnetic field shows that the stator teeth 6 are optimally suited to be made of grain-oriented magnetic steel sheet, whereas the use of non-grain-oriented magnetic steel sheet is envisaged for the stator yoke 5.

Advantageously, the permanent magnet generator 1 comprises coupling means 8, 9 between the stator yoke and said stator teeth.

In particular, preferably the coupling means 8, 9, 10 comprise interlocking means 8, 9 between one end of each of the stator teeth 6 and respective portions of an external perimeter surface of the stator yoke 5.

According to a preferred embodiment, shown in the figures, the interlocking means 8, 9 are composed of a dovetail interlocking system.

In particular, according to this preferred embodiment, the interlocking means 8, 9 comprise a plurality of trapezoidal openings 8 made spaced away from each other on the external perimeter surface of the stator yoke 6, and respective trapezoidal protrusions 9 made at one end of each of the stator teeth 6. The trapezoidal protrusions 9 are coupled by interlocking inside the trapezoidal openings 8.

Furthermore, the coupling means 8, 9, 10 comprise blocking means 10 of the ends of each of the stator teeth 6 to the respective portions of the external perimeter surface of the stator yoke 5.

In particular, the blocking means 10 comprise at least one clamping flange associated with the stator yoke 5 for the blocking of the trapezoidal protrusions 9 inside the trapezoidal openings 8.

Specifically, the blocking means 10 are composed of a pair of said clamping flanges associated with substantially opposite lateral portions of the stator yoke 6.

Furthermore, the stator yoke 6 comprises connecting means 11 to an endothermic motor.

In particular, the connecting means 11 are composed of a plurality of coupling holes made on the stator yoke 6, which can be coupled to the endothermic motor by means of suitable threaded means.

According to a preferred embodiment, the stator assembly comprises a coating made of plastic material which is resistant to high temperatures, made on at least one portion of the stator yoke 5 and/or of the stator teeth 6.

Preferably, the coating made of plastic material which is resistant to high temperatures completely covers the stator yoke 5 and the stator teeth 6 after they have been coupled together.

Such coating can be achieved, e.g., by means of co-molding operations.

It has in practice been ascertained that the described invention achieves the intended objects.

In particular, the fact is underlined that the advantage obtained with the use of the grain-oriented sheet for the stator teeth only, considering applications of the permanent magnet generator according to the invention in the generator application for All Terrain Vehicles systems (A.T.V.) and snowmobiles, is to be able to produce more current at low speeds of rotation with the same mechanical size and performance of the magnets.

Figure 6:
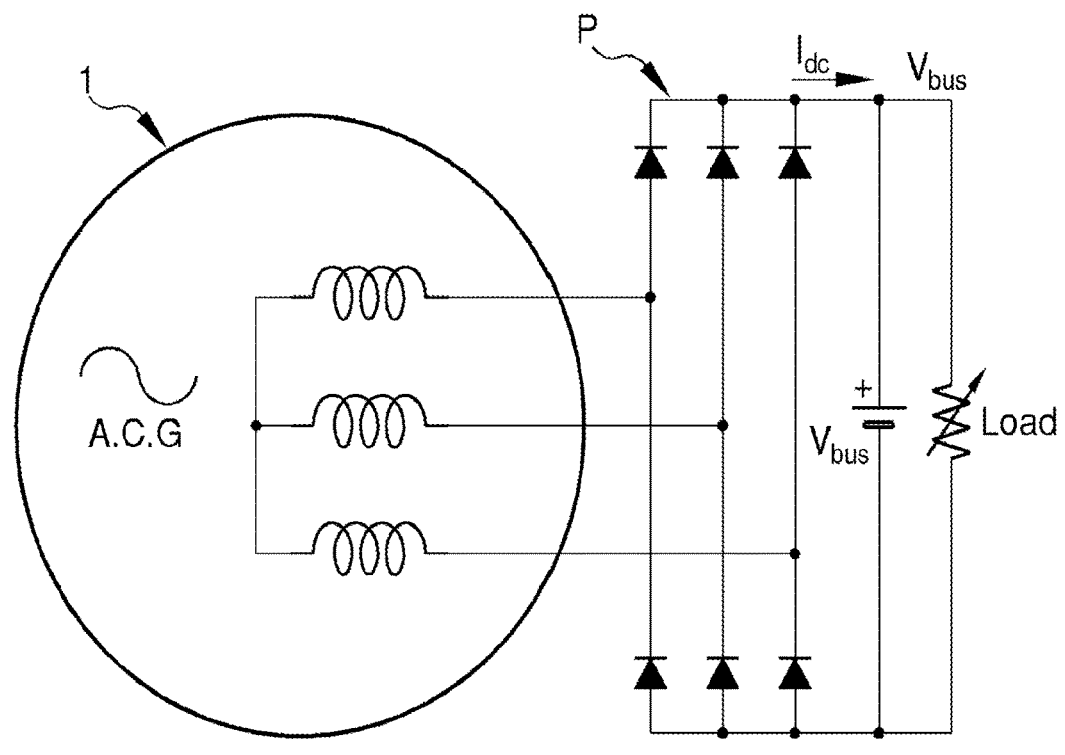
FIG. 6 is a schematic representation of a possible test circuit of the permanent magnet generator according to the invention.
Figure 7:
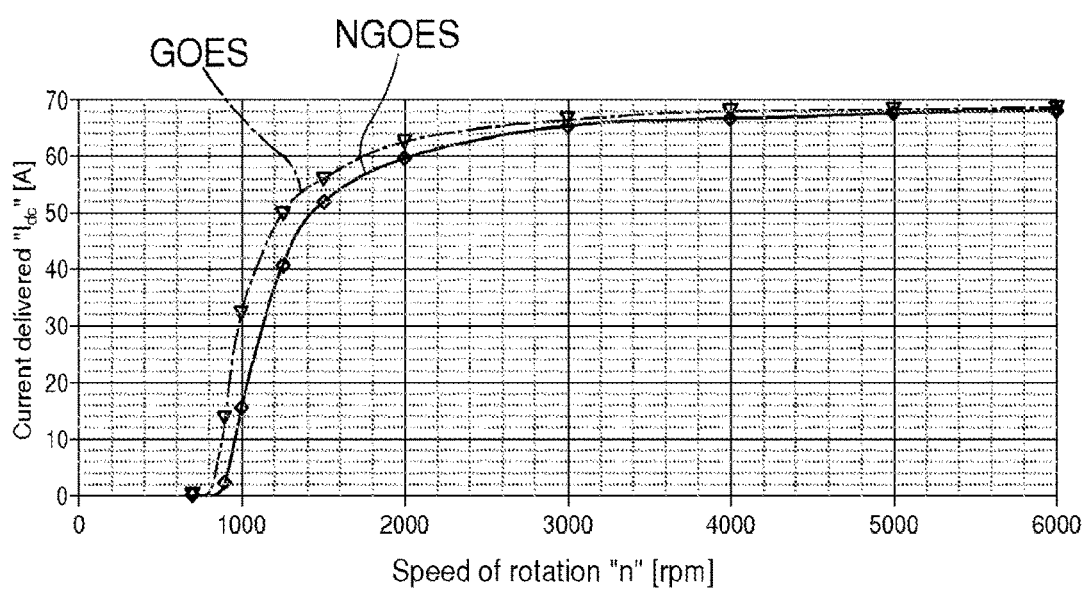
FIG. 7 is a comparison table comparing the current delivered by the permanent magnet generator according to the invention with the current delivered by a conventional non-grain oriented (NGOES) generator.

For example, considering a test circuit like the one schematized in FIG. 6, composed by a three-phase diode rectifier bridge P and a variable load Load in order to keep constant the voltage Vbus, it is possible to obtain the two current curves NGOES and GOES, referred to a generator of conventional type without grain-oriented sheet and to the generator according to the invention, respectively, with the stator teeth made of grain-oriented sheet. From this graph it is possible to clearly ascertain the advantages of the new solution with reference to the higher current supplied.

In addition to an improvement in the performance of the electrical machine and a miniaturization of the generator, this patent invention also brings greater flexibility in terms of applications of use.

In particular, the particular structure of the stator assembly allows for two different developments in the manufacturing process.

According to a first possible production choice, it is possible to co-mould the individual stator tooth. This choice allows making the copper conductive winding directly on the individual tooth with needle winding machines which are able to work at higher speed and with a better quality of the copper wire stratification.

According to a possible further production choice, it is possible to co-mould the whole stator (yoke and teeth). This solution provides the part with greater mechanical solidity but makes the winding process slower.

Therefore, if a permanent magnet generator with particularly strong solidity characteristics is required, for example when coupled to a high performance endothermic motor capable of generating strong vibrations, then it is preferable to use an overall co-molding of the yoke and teeth assembly of the stator.

On the other hand, in the case wherein it is necessary to privilege a reduced production time or in all those cases in which the vibrations transmitted by the motor are not particularly high, then co-molding the individual tooth is the most suitable choice.

The invention claimed is:

1. A permanent magnet generator for on-board vehicle charging, the permanent magnet generator comprising:
   an external rotor;
   a stator assembly accommodated inside said external rotor and provided with a stator yoke, with a plurality of stator teeth extending from said stator yoke and with a plurality of conductive windings arranged around at least one portion of each of said stator teeth; and
   at least one permanent magnet associated with at least one portion of an internal wall of said external rotor and facing said stator assembly,
   wherein said stator yoke is made of magnetic steel sheet with non-oriented grains, and
   said stator teeth are made of magnetic steel sheet with oriented grains,
   wherein said permanent magnet generator further comprises coupling means between said stator yoke and said stator teeth, and wherein said stator yoke is a single-piece component comprising a plurality of coupling holes for directly mounting the stator assembly to an endothermic motor.

2. The permanent magnet generator according to claim 1, wherein said stator assembly comprises a coating made of plastic material which is resistant to high temperatures made on at least one portion of said stator yoke and/or of said stator teeth.

3. The permanent magnet generator according to claim 1, wherein said coupling means comprise interlocking means between one end of each of said stator teeth and respective portions of an external perimeter surface of said stator yoke.

4. The permanent magnet generator according to claim 3, wherein said interlocking means comprise a plurality of trapezoidal openings made spaced away from each other on said external perimeter surface of said stator yoke, and respective trapezoidal protrusions made at one end of each of said stator teeth, said trapezoidal protrusions being coupled by interlocking inside said trapezoidal openings.

5. The permanent magnet generator according to claim 4, wherein said coupling means comprise blocking means of said ends of each of said stator teeth to said respective portions of the external perimeter surface of the stator yoke.

6. The permanent magnet generator according to claim 3, wherein said coupling means comprise blocking means of said ends of each of said stator teeth to said respective portions of the external perimeter surface of the stator yoke.

7. The permanent magnet generator according to claim 6, wherein said blocking means comprise at least one clamping flange associated with said stator yoke for the blocking of said trapezoidal protrusions inside said trapezoidal openings.

8. The permanent magnet generator according to claim 7, further comprising: one pair of said clamping flanges associated with substantially opposite portions of said stator yoke.

9. The permanent magnet generator according to claim 3, wherein said interlocking means comprise a dovetail interlocking system.

10. The permanent magnet generator according to claim 9, wherein said coupling means comprise blocking means of said ends of each of said stator teeth to said respective portions of the external perimeter surface of the stator yoke.

11. The permanent magnet generator according to claim 9, wherein said interlocking means comprise a plurality of trapezoidal openings made spaced away from each other on said external perimeter surface of said stator yoke, and respective trapezoidal protrusions made at one end of each of said stator teeth, said trapezoidal protrusions being coupled by interlocking inside said trapezoidal openings.

12. The permanent magnet generator according to claim 11, wherein said coupling means comprise blocking means of said ends of each of said stator teeth to said respective portions of the external perimeter surface of the stator yoke.

* * * * *